United States Patent [19]

Trethewey et al.

[11] 4,092,780
[45] June 6, 1978

[54] ELECTRICIAN'S FISH TAPE

[75] Inventors: Thomas E. Trethewey; Peter M. Wells, Jr., both of Sycamore, Ill.

[73] Assignee: Ideal Industries, Inc., Sycamore, Ill.

[21] Appl. No.: 805,898

[22] Filed: Jun. 13, 1977

Related U.S. Application Data

[63] Continuation of Ser. No. 648,149, Jan. 12, 1976, abandoned, which is a continuation-in-part of Ser. No. 603,324, Aug. 11, 1975, abandoned.

[51] Int. Cl.² ............................................. G01B 3/10
[52] U.S. Cl. ..................................... 33/139; 33/126.5; 254/134.3 FT
[58] Field of Search ............. 254/134.3 FT; 33/126.5, 33/126.6, 139, 140, 138

[56] References Cited

U.S. PATENT DOCUMENTS

| 138,310 | 4/1873 | Baldwin | 33/139 |
| 900,351 | 10/1908 | Brown | 33/126.5 |
| 2,718,376 | 9/1955 | Raney | 254/134.3 FT |
| 2,930,584 | 3/1960 | Hensley et al. | 33/139 |
| 3,343,809 | 9/1967 | Newell | 254/134.3 FT |
| 3,424,435 | 1/1969 | Niemann | 254/134.3 FT |

Primary Examiner—Steven L. Stephan
Attorney, Agent, or Firm—Kinzer, Plyer, Dorn & McEachran

[57] ABSTRACT

This is concerned with a combination fish tape reel and spreader mechanism which includes a handle and counter device so that the length of tape payed out will be measured.

12 Claims, 9 Drawing Figures

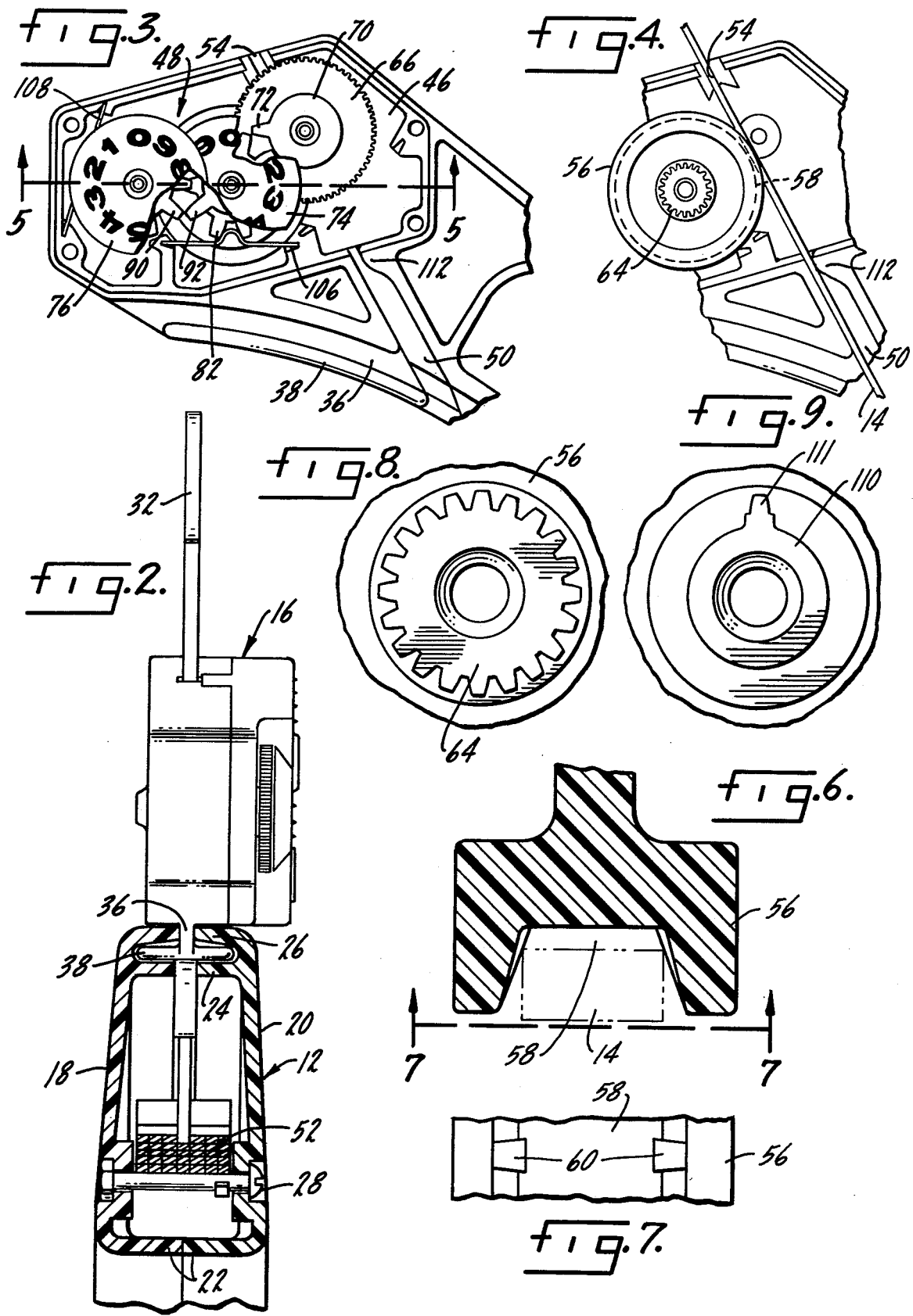

ELECTRICIAN'S FISH TAPE

This is a continuation of application Serial No. 648,149, filed January 12, 1976, now abandoned, and which was a continuation in part of application, Serial No. 603,324, filed August 11, 1975, now abandoned.

SUMMARY OF THE INVENTION

This invention relates to an electrician's fish tape reel assembly having means to measure and display an indication of the length of tape feed.

In the course of completing electrical wiring extended forwardly through a conduit it is customary for the electrician to pass a so-called fish tape back through the conduit to the opposite end of the conduit where the lead end of the electrical wiring is presented. The lead end of the wire is fastened to the lead end of the tape and the tape is retracted to pull the wire forward. The tape may also be used to obtain an approximation of the location of an obstruction in the conduit.

There was a time when the cost of wasted wire could be disregarded. The electrician was not particularly concerned about wasting several feet when overestimating the length of wire required. In the present market the cost factor of wasted wire is of significance.

A primary object of the present invention is to enable the length of wire to be extended through a conduit to be accurately measured as an incident to utilization of the fist tape.

Another object is to enable the fish tape to be employed to accurately measure the location of an obstruction in the conduit.

Another object is to drive an index disc as an incident to tape extension, to record (count) the rotations of the index wheel and to display visually the linear equivalent of the number of indexing steps or turns as an indication of linear tape feed.

Another object is to assemble the index disc, its drive and the recording components within a relatively small space while nonetheless assuring an accurate monitoring of tape extension, accuracy being achieved by relying on a compartively large drive wheel driven frictionally by the tape in a nonslip relation and by utilizing an interposed gear reducer to rotate the index wheel.

Another object is to enable conversion to the metric system to be easily accomplished, specifically by equipping the drive wheel with interchangeable gears.

Another object is a combination fish tape reel and tape winder assembly which includes a handle and counter mechanism.

Another object is a counter mechanism in the tape winder or spreader for a fish tape reel in which the winder is moved peripherally around the reel to either pay out or take in tape.

Another object is a fish tape reel and winder of the above type in which a positive drive of the counter mechanism by the tape is insured by the construction of the tape channel through the winder.

Another object is a device of the above type in which the counter mechanism can be easily reset or zeroed.

Another object is a fish tape counter mechanism which is not a part of the fish tape reel but is operable therewith.

Other objects will appear from time to time in the ensuring specification and drawings.

BRIEF DESCRIPTION OF THE DRAWINGS

FIG. 2 is a sectional view on the line 2—2 of FIG. 1;

FIG. 3 is a plan view of the handle, with a cover removed to expose the counting mechanism;

FIG. 4 is a partial plan view of FIG. 3 with parts removed for clarity;

FIG. 6 is a fragmentary detail view of the drive wheel;

FIG. 7 is another fragmentary detail view of the drive wheel, on the line 7—7 of FIG. 6;

FIG. 8 is an elevation of a spur gear; and

FIG. 9 is an elevation of a change gear.

DESCRIPTION OF THE PREFERRED EMBODIMENTS

Figure 1:
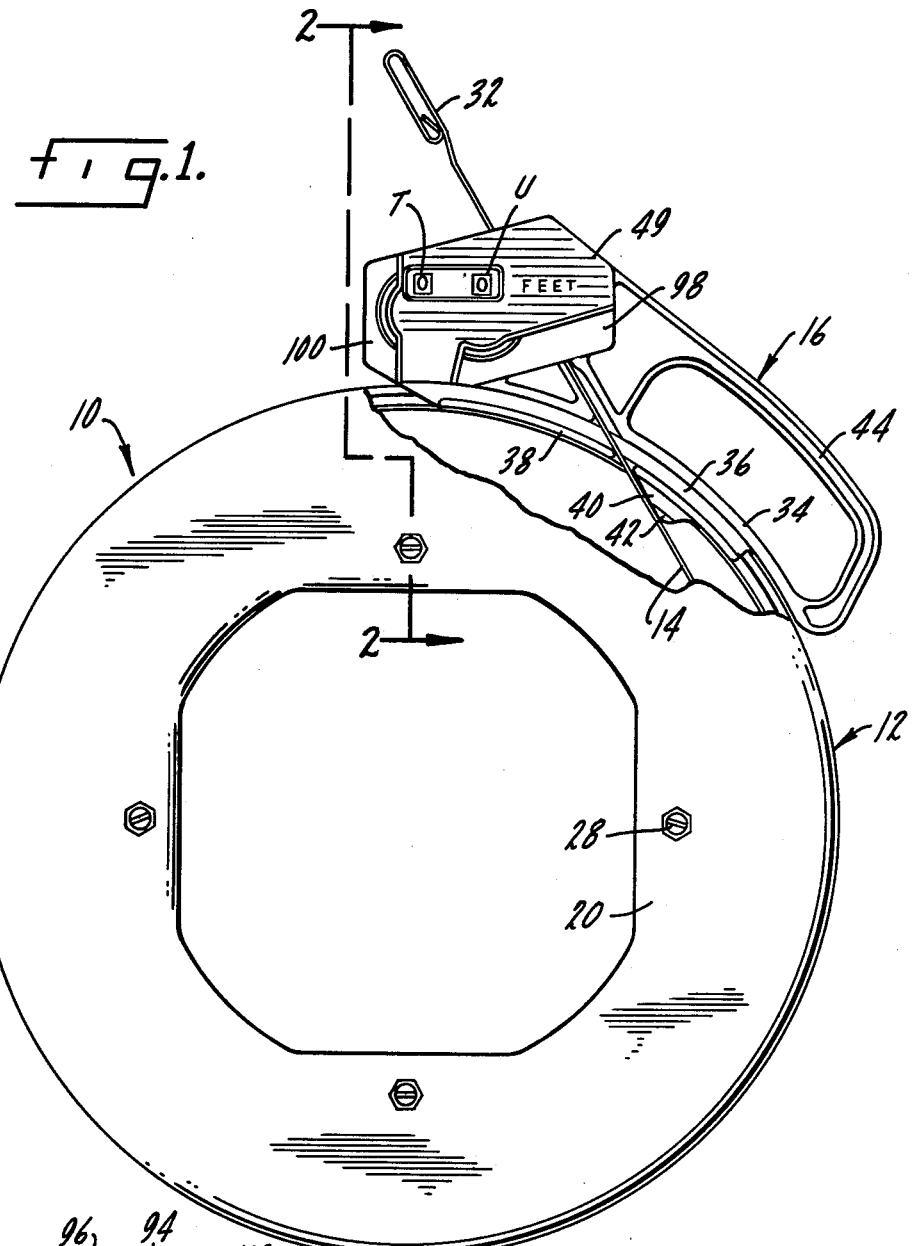
FIG. 1 is a plan view of the fish tape reel assembly of the present invention, partly broken away, to reveal certain features.

A fish tape reel assembly is indicated generally at 10 and includes a reel 12, a fish tape 14, and a fish tape winder 16. The reel 12 may be made up of two identical or generally similar annular shaped sections 18 and 20 which may be made of plastic, such as high density polyethylene or the like. As will be seen in FIG. 2, each reel section has an inner flange 22 which abut together and defining a somewhat square opening, as shown in FIG. 1, and a pair of outer flanges or lips 24 and 26 with the two halves or sections 20 being brought together and clamped by a plurality of bolts 28 or the like, with the configuration and dimensioning being such that the outer lips 26 are brought together under pressure or under a certain amount of preload. The inner end of the tape may be connected to or wrapped around one of the bolts, while the outer or free end 32 may be formed into an eye or loop in the conventional manner so that a wire may be connected to it.

The fish tape winder 16 is generally flat and somewhat irregularly shaped and may be made of a plastic such as polycarbonate or the like. The tape winder has an arcuate shape guide 34 consisting of a flange outstanding on top on both sides of an inwardly extending rib 36 which passes between the outer lips 26 with an inner flange 38 extending outwardly therefrom on both sides in the slide channel formed between the two sets of radially spaced lips 24,26. An additional localized rib 40 may extend inwardly somewhat from flange 38 but is greatly foreshortened circumferentially, as shown in FIG. 1, compared to rib 36. A flange 42 may extend outwardly across the bottom of short rib 40 to function as a tape drag.

As shown in FIG. 1, the tape winder has a right and left hand area, the right hand area having an opening therethrough a define a handle 44 which may be shaped or dimensioned in any suitable fashion. The left hand area includes an enclosed chamber 46 for a counter mechanism 48 which will be explained in detail hereinafter. A suitable cover 49 covers or closes the counter chamber and is disposed on one side thereof and held by any suitable connecting means, such as screws or the like. A channel 50 extends upwardly in a direction generally tangent from the accumulated tape 52 in the reel and passes through the counter chamber with an outlet 54 on the outside.

Tape feed is tracked by a drive wheel 56, FIGS. 3 and 4. The wheel 56 has a V-shaped peripheral groove 58, FIG. 6, and the positioning of the wheel is such that the circumferential groove 58 is juxtaposed proximately to the guide channel 50 so that the tape feeds through groove 58.

The root diameter or bottom of the groove 58 is considerably more narrow than the tape 14 to assure a wedge fit between the edges of the tape and the sloped sides of the groove 58. Accordingly, the drive wheel engages the tape in a friction fit, establishing a positive friction drive. Preferably the wheel 56 is composed of high friction plastic such as urethane. The sloped sides of the groove 58 are provided with spaced ribs or serrations 60, FIG. 7, further to assure that the tape during extension or feed-out will rotate the drive wheel in a nonslip relation. In this manner both unevenness and incidental flexure in the tape will be compensated.

As will be explained, the drive wheel rotates on index disc and the index disc in turn steps a set of counting gears. A reducing gear train is interposed between the drive wheel and the index disc. In this manner, by driving the index disc through a gear train, it is possible to accommodate surface imperfections in the tape which arise through normal use, compared to using the drive wheel directly as an index for the counting gears. Also, such arrangement enables conversion to the metric system to be selectively made and it is possible to employ a drive wheel of comparatively large size, which reduces error in measurement.

Figure 5:
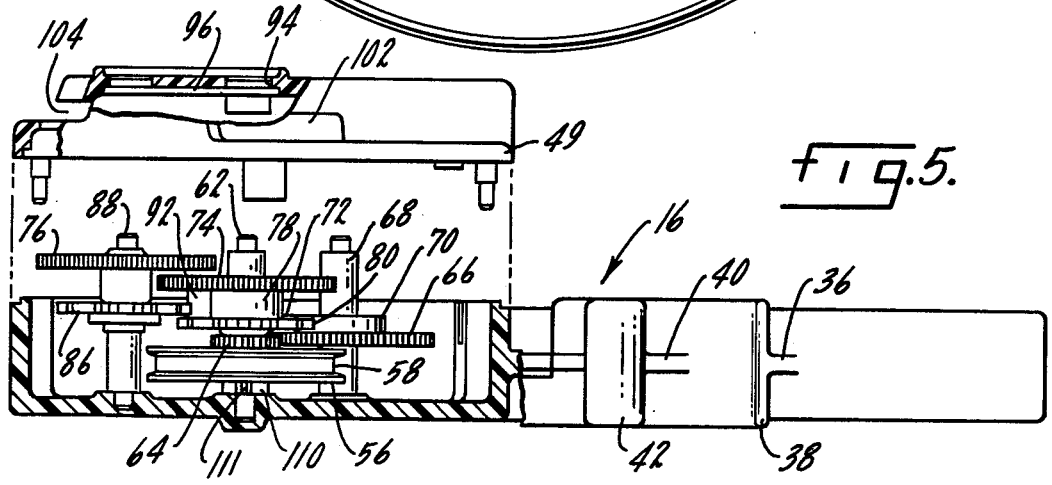
FIG. 5 is an enlarged sectional view on the line 5—5 of FIG. 3.

The drive wheel 56 is supported for rotation on a long pin 62, FIG. 5. A spur gear 64 (having twenty teeth, for example) is fixed to one side of the drive wheel. The spur gear is meshed with a main gear 66 fixed on a thick axle 68. An index disc 70 is also secured to the axle 68, and it is the index disc which is used to generate a count of linear units of tape extension.

The main gear 66, for example, has sixty teeth, establishing a 3.1 drive reducing ratio in the gear train. The pitch circle of the drive wheel, where the tape is captured, measures four inches in circumference. Consequently three turns of the drive wheel produces one revolution of the index disc, equivalent to one foot of tape length.

The index disc has a single tooth 72, FIG. 3. The rotations of the index tooth are counted. The count is recorded and displayed by units numbered wheel 74 and a tens numbered wheel 76.

The units numbered wheel 74, FIG. 5, is keyed to a hub 78 and a units counting gear 80 is also keyed to hub 78. This subassembly is mounted for rotation on pin 62. The units counting gear has ten teeth 82, FIG. 3, positioned in opposition to the stepping tooth 72 on the index disc. Consequently the units gear, and the numbered wheel as well, are stepped one tooth (one foot) for each rotation of the index disc.

To extend the count indicating linear tape feed, a tens counting gear 86, FIG. 5, is keyed to the tens numbered wheel, the two being supported for rotation on a pin 88. The tens gear teeth 90, FIG. 3, are opposed to a wide carry tooth 92 of the units counting gear.

The assembly shown in FIG. 5 is secured by the cover 49 which has openings (not shown) for supporting the opposite ends of the pins on which the rotating parts are mounted.

The cover 49 is provided with one or more openings 94 in which a lens or glass 96 is mounted through which the numbers U, FIG. 1, of the units wheel may be viewed and the numbers T of the tens wheel.

In order that resetting may be easily accomplished, the cover is provided with two recessed or reduced areas 98 and 100, thereby providing sidewalls which have openings 102 and 104 of limited peripheral or arcuate extent through which a portion of the units numbered wheel and the tens wheel extend, as shown in FIG. 1. The periphery of both the units wheel 74 and tens wheel 76 may be knurled. The positioning of the units counter and the tens counter is held by respective spring detents 106 and 108, FIG. 3.

The drive wheel, as noted, carries a spur gear 64. This gear (say, twenty teeth, FIG. 8) meshed with the main gear establish a drive ratio in terms of the English foot for rotating the index tooth 72. To index in terms of the metric system, meters rather than feet, a change gear 110, having only one tooth 111, is substituted for spur gear 64, and another main gear (not shown) having ten teeth is substituted for gear 66. The change gear 110, FIG. 5, is mounted on the side of the drive wheel opposite spur gear 64; the pitch circle is the same for both gears.

To make the change it is merely necessary to make the substitution for gear 66 and invert the drive wheel on pin 62 to present gear 110 to the main gear. Ten transits of gear 110 (forty inches) are therefore necessary to rotate the substitute main gear 360°, equal to about 1.01 meters, well within the limits of practical measurement. No other change is necessary since the counting gears only count turns of the index tooth without regard to whether the turn of the index tooth is an English or metric linear equivalent.

The channel through the handle for the tape spanning or passing through the counter chamber 46 has the inlet channel 50 with an offset 112 where it opens into the counter chamber so that the reduced passage provides a snug fit with the tape. It is desirable that the snug passage extend for a certain linear extent so that the tape in a sense is trapped and has a certain cantilever action when passing through the reduced channel, rather than a pivoting action. The same is true of the outlet 54 which provides a snug fit through a narrow channel for a certain linear extent. Thus the tape span between the two snug channels is cantilevered at each end and the dimensioning is such that the peripheral, somewhat V-shaped groove or channel 58 or sloping sides of the groove in the circumference of the drive wheel will engage against the two side edges in a positive friction drive with the cantilevered effect preventing the tape span in the counter chamber from flexing or bowing away from the drive wheel.

The use, operation and function of the invention are as follows:

The tape winder and counter mechanism 16 is mounted between the opposed lips on the outside of the reel and tend to spread the lips somewhat for a limited peripheral extent. It is preferred that clamping of the two reel sections together by the bolts, or what-have-you, induces a certain preload in the lips so that they are held tightly together to prevent dirt and dust from getting in. But it might be otherwise. This is to say that it is preferred that the tape winder and counter mechanism be clamped somewhat between the opposed lips, which can best be accomplished by a certain amount of preload.

At the same time, the reel spreader actually spreads the lips for a limited peripheral extent so that the tape can move through smoothly without touching either of the lips, although it might be otherwise. For example, the tape itself might do the spreading with the winder riding along in a sliding fit around the reel.

The winder itself has a counter chamber in which a counter mechanism is operated by the tape moving through a guide channel when either being payed out or rewound. The particular configuration of the channel has the advantage that a cantilevered effect is provided at both ends of the tape span in the counter chamber so that a positive drive of the counter mechanism is provided. At the same time, the wheels may be easily reset from the outside by the configuration of the cover and a simple change is involved to go from English to metric.

The tape itself may be standard, which is to say somewhat rectangular in cross section and is dimensioned so that it will not hit the bottom of the V-shaped groove 58 in the drive wheel. This is to say that the side edges on each side of the tape bear against the slanting sides of the groove in the drive wheel with the ribbing 60 providing a firm drive to avoid slippage and inaccuracy.

While the opposed lips on the outside of the reel have been shown as directly axially aligned, it should be understood that they might be offset somewhat and overlapping due to what would otherwise be the preloading referred to above with the spreader itself flexing the sidewalls out when it separates the lips.

The embodiment of this invention in which an exclusive property or privilege is claimed are defined as follows:

1. For use in an electrical fish tape reel assembly in which a reel includes a generally annular tape-receiving chamber peripherally bounded by a pair of axially opposed lips adapted to separate to permit winding and unwinding of a fish tape in the chamber, the improvement comprising a tape winder adapted to be mounted between the lips so as to project outside of the reel and constructed to be moved peripherally around the reel between the lips, a tape passage through the tape winder for passage of the tape therethrough, a counter chamber in the tape winder, a handle on the tape winder, the tape passage being directed outwardly through the winder at an oblique angle to the radius of the reel and extending through the counter chamber for passage of the tape therethrough, the tape passage including an inlet passage on the inside of the winder and an outlet passage on the outside thereof spaced from each other to provide an aligned rectilinear path for a free span of tape in the counter chamber, and a counter mechanism in the counter chamber mounted on one side of the tape passage including a rotary drive wheel in fixed position in the counter chamber, the radius of the drive wheel being greater than the distance between its axis and the rectilinear path for the free span of tape to provide a positive friction drive between the tape and the drive wheel so that the counter mechanism will indicate a linear measure for the tape fed to and from the reel.

2. The structure of claim 1 further characterized in that at least one of the passages is shaped to snugly fit the tape over a certain linear extent thereof in its passage therethrough so that the span of tape in the counter chamber will not flex away from the drive wheel.

3. A fish tape assembly according to claim 1 in which the drive wheel has a V-shaped circumferential groove capturing the tape in a nonslip drive relation.

4. A fish tape assembly according to claim 3 in which the groove of the drive wheel is provided with serrations of high friction material for gripping the edges of the tape.

5. A fish tape assembly according to claim 1 in which the gear means includes a pair of change gears, one change gear for rotating the index disc in accordance with English linear units and the other for rotating the index disc in accordance with metric linear units.

6. A fish tape assembly according to claim 5 in which the change gears are supported by the drive wheel.

7. The structure of claim 1 further characterized in that the inlet and outlet are both shaped to snugly fit the tape over a certain linear extent thereof in its passage therethrough so that the span of tape therebetween will not flex away from the drive wheel.

8. The structure of claim 1 further characterized in that the counter chamber is defined at least in part by a removably mounted cover on one side of the winder, and at least one window in the cover for observing the counter mechanism.

9. The structure of claim 1 further characterized in that the drive wheel has a V-shaped circumferential groove on the periphery thereof, and a plurality of generally radially disposed ribs in the sides of the V-shaped groove to provide a nonslip drive relation with the tape.

10. The structure of claim 9 in which the drive wheel is made of urethane.

11. The structure of claim 9 further characterized in that the tape is wider than the bottom of the groove in the drive wheel so that the sides of the tape engage the inclined sides of the groove.

12. The structure of claim 1 further characterized in that the counter chamber is on one side of the tape passage and the handle is on the other side.

* * * * *